Jan. 27, 1970   D. W. ZIMMERMAN ET AL   3,491,427
APPARATUS FOR HANDLING AND ASSEMBLING OBJECTS
Filed May 1, 1967   3 Sheets-Sheet 1
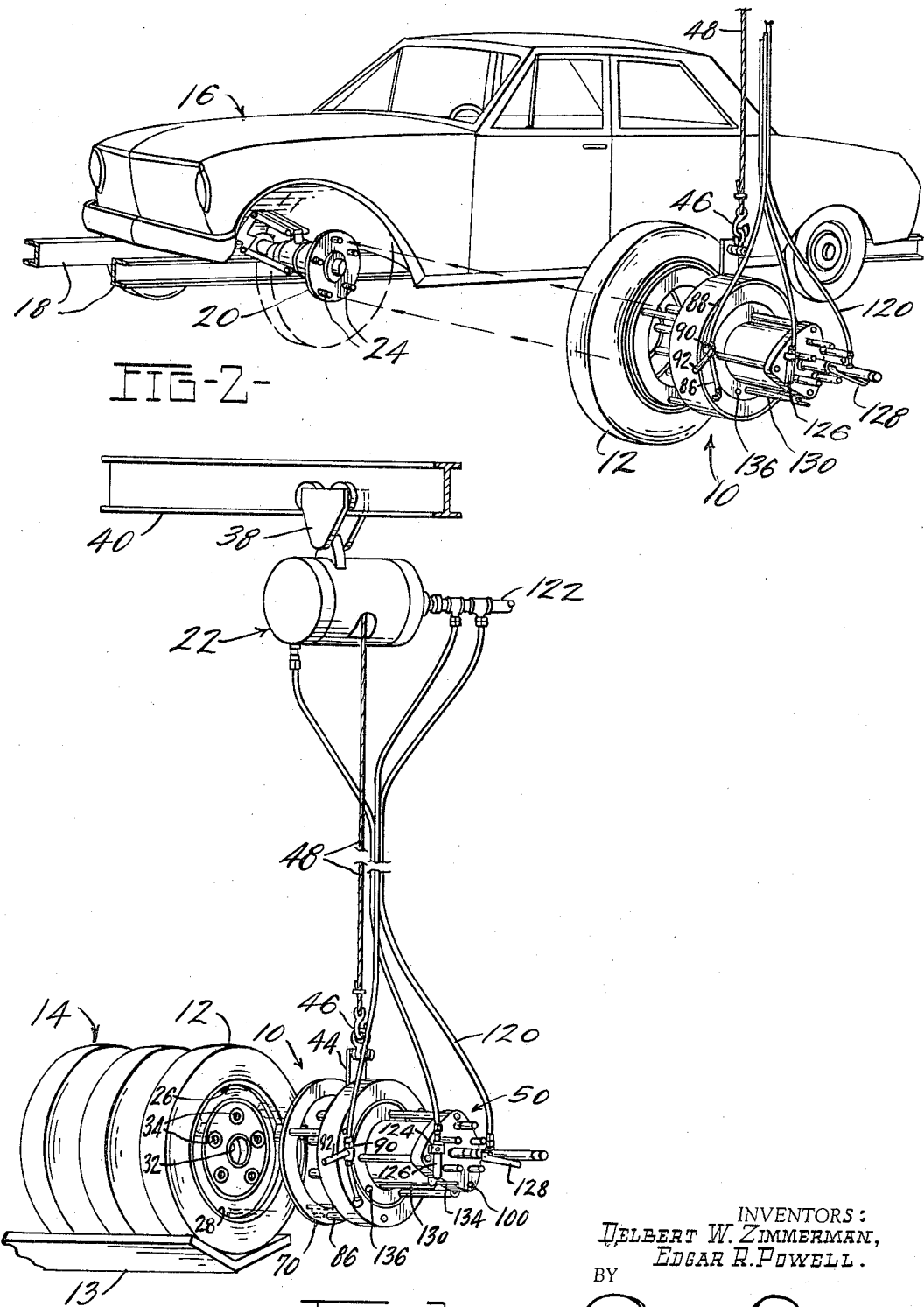
INVENTORS:
DELBERT W. ZIMMERMAN,
EDGAR R. POWELL.
BY
Owen & Owen
ATT'YS.

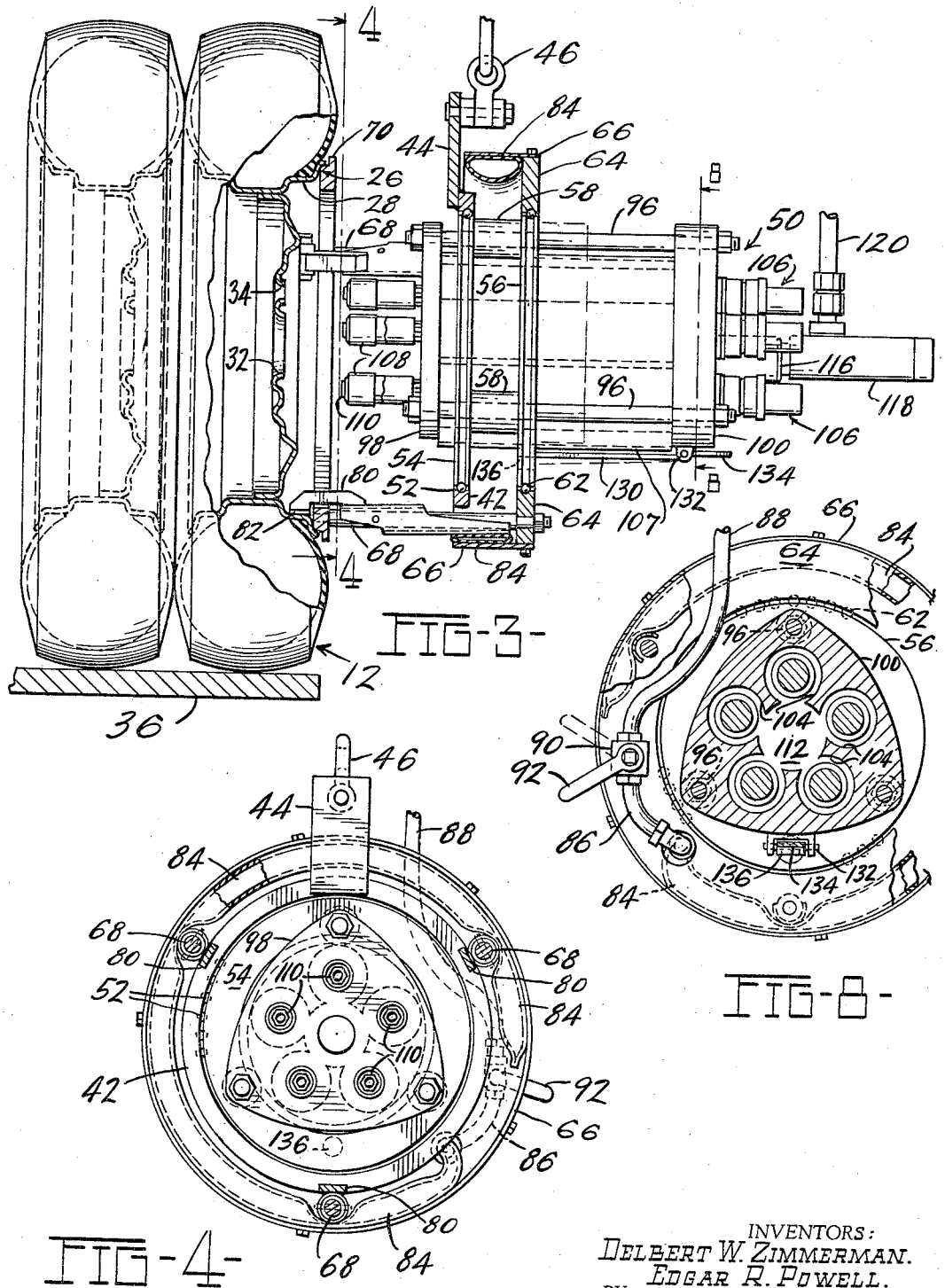

Jan. 27, 1970     D. W. ZIMMERMAN ET AL     3,491,427
APPARATUS FOR HANDLING AND ASSEMBLING OBJECTS
Filed May 1, 1967     3 Sheets-Sheet 3
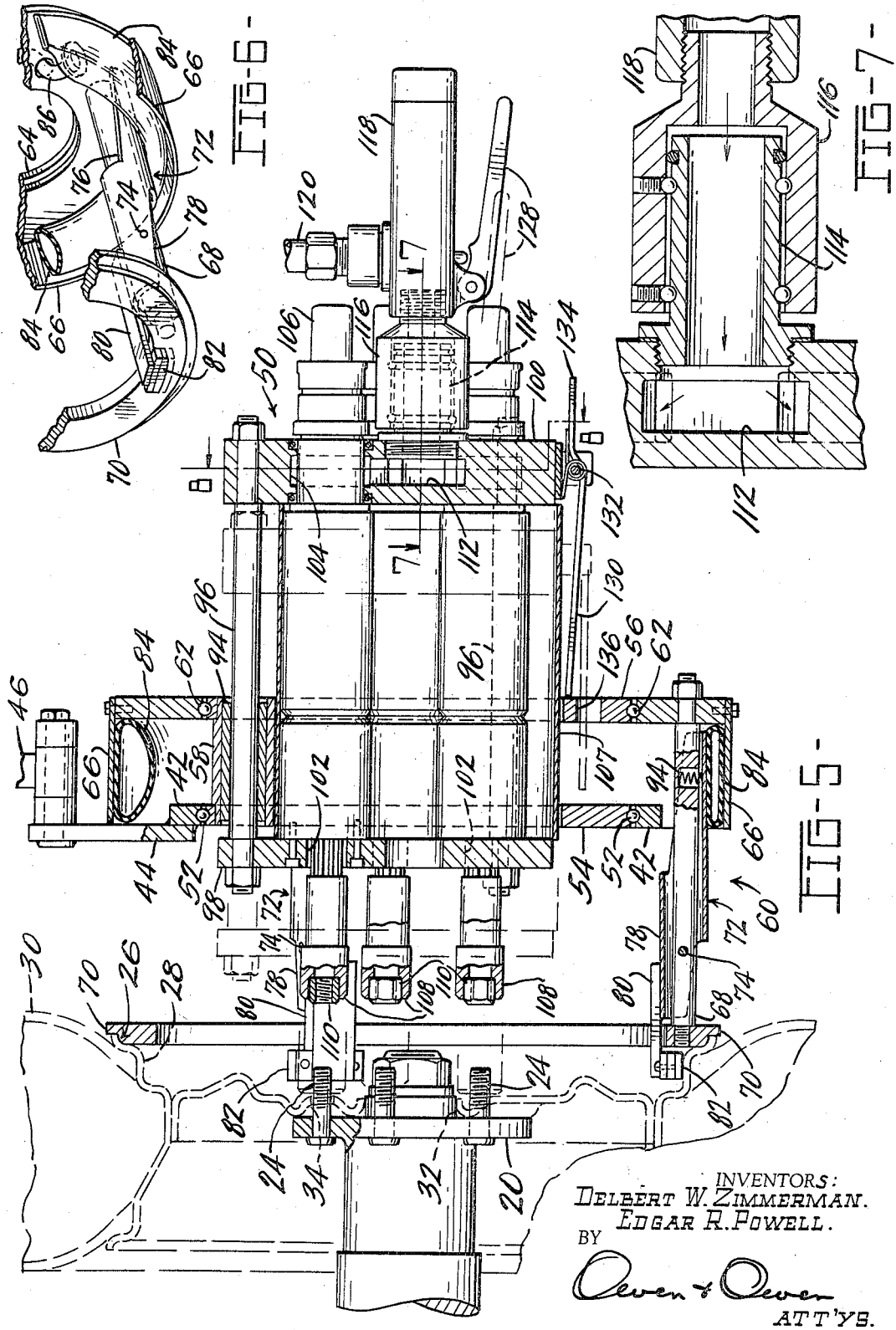
INVENTORS:
DELBERT W. ZIMMERMAN.
EDGAR R. POWELL.
BY
Owen & Owen
ATT'YS.

United States Patent Office 3,491,427
Patented Jan. 27, 1970

3,491,427
APPARATUS FOR HANDLING AND
ASSEMBLING OBJECTS
Delbert W. Zimmerman, Toledo, Ohio, and Edgar R. Powell, Birmingham, Mich., assignors to D. W. Zimmerman Mfg., Inc., Toledo, Ohio, a corporation of Ohio
Filed May 1, 1967, Ser. No. 635,131
Int. Cl. B23p 19/04
U.S. Cl. 29—240                                    14 Claims

ABSTRACT OF THE DISCLOSURE

A device carried by an overhead hoist is used to pick up automobile wheels, transport them to an automobile on an assembly line, and affix the wheels to the axle flanges of the automobile. The device enables one man to assemble the wheel on the automobile in place of two or three men heretofore required and to do so in a short period of time.

---

This invention relates to a device for handling an assembling objects and specifically to a device used with an overhead hoist for handling wheels and assembling them on an automobile.

In the manufacture of automobiles, the relatively simple task of placing the wheels on the automotibe has been time consuming and has required a substantial amount of labor. Three men were often used, two to carry the wheel to the automobile and position it on the mounting bolts with the third man operating a tool to drive and tighten the fasteners.

The present invention provides a unique device for handling objects and is specifically designed for handling wheels on an assembly line. With the device employed in combination with an overhead hoist, a single operator can pick up a wheel from a supply source, transport it to the assembly line, position the wheel with respect to the axle flange, and tighten the fasteners relatively quickly. Specifically, the device includes a supporting ring connected to the overhead hoist with a second ring carrying hub-engaging means rotatably mounted on the first ring. A third ring is rotatably supported through the first ring and carries a plurality of fastening devices positioned so that all of the fasteners can be tightened in one operation. The third ring further includes means for reciprocating the fastening devices to move them toward and away from the wheel to enable the operator to more easily position wheel on the automobile axle flange.

It is, therefore, a principal object of the invention to provide a device for handling and assembling objects more rapidly and with less labor than heretofore.

Another object of the invention is to provide a device for carrying a wheel, positioning it on an axle flange, and fastening the wheel to the flange while requiring the labor of only one operator.

Numerous other objects and advantages of the invention will be apparent from the following detailed decription of a preferred embodiment thereof, reference being made to the accompanying drawing, in which:

FIG. 1 is a view in perspective of a supply of wheels and a wheel handling device, embodying the invention, carried by an overhead hoist;

FIG. 2 is a view in perspective of the device of FIG. 1 with a wheel engaged therewith, and of an automobile with which the wheel is to be assembled;

FIG. 3 is an enlarged view in side elevation, with parts broken away and with parts in section, of the wheel handling device engaged with a wheel from the supply source;

FIG. 4 is a front view in elevation of the device of FIG. 3;

FIG. 5 is a further enlarged view in longitudinal, vertical cross section of the wheel handling device about to fasten a wheel to an automobile;

FIG. 6 is a fragmentary, detailed view in perspective of a portion of the device;

FIG. 7 is an enlarged view in cross section taken along the line 7—7 of FIG. 5; and FIG. 8 is a smaller view in vertical cross section taken along the line 8—8 of FIG. 5.

Referring particularly to FIGS. 1 and 2, a wheel handling device indicated at 10 is employed to pick up a wheel 12 from a supply source indicated at 14 and transport the wheel to an assembly line where an automobile 16 is carried along a conveyor 18. The wheel 12 is then positioned concentrically by the operator with respect to an axle flange 20 by manipulating a hoist 22 which carries the device and the wheel 12. The wheel 12 is then rotated by the operator until properly aligned with mounting bolts 24 on the flange 20, at which time the wheel is moved into assembled relation with the flange. Fastener means carried by the device 10 are then used to drive and tighten the fasteners and complete the assembly operation, the fastener means also first being rotatable as a unit in order to be aligned with the mounting bolts 24. With this arrangement, one operator can pick up the wheel, transport it to the assembly line, position it on the axle flange, and fasten the wheel to the flange. The single operator thereby takes the place of two or three men heretofore required for the operation, in which instance, one or two men carry the wheel to the automobile and position the wheel on the flange, while an additional man operates fastening means to assemble the flange and wheel.

While in the particular instance shown, the mounting bolts 24 are carried by the axle flange 20, the invention is equally applicable with those automobiles in which the mounting bolts are threaded into holes in the flange after the wheel is positioned thereon. In the present instance, nuts for the bolts are carried by the device 10 whereas in the other type of assembly, the mounting bolts would be carried by the device 10.

Referring more particularly to FIGS. 3 and 5, the wheels 12 each comprise a central hub 26 having rims 28 on which tires 30 are mounted in the usual manner. Each of the hubs 26 has a central opening 32 and five smaller openings or bolt holes 34 located on a circle of a given radius equal to the radius of the circle of the mounting bolts 24. The device 10 carries the wheel 12 by engaging the rim 28, which enables the device to mount the wheel on the automobile without interfering with the fender. Such interference might otherwise occur, for example, if the outer periphery of the tire were engaged by the device.

After the device 10 engages the wheel, as shown in FIG. 3, it is picked off a supply rack 36 and is carried toward the production line along with the overhead hoist 22 which has a trolley 38 carried on a rail 40. The rail can extend from the supply source 14 to the assembly line and then extend along the assembly line for a distance, if desired. This enables the carrying device 10 and the wheel 12 to move along the conveyor 18 with the automobile 16 as the wheel is being assembled with the axle flange, if desired. In this manner, the automobile will move continuously without having to be periodically stopped and started.

When the wheel 12 is moved to the automobile, the hoist 22 is manipulated to move the hub 26 to the same level as the flange 20. With the hub centered with respect to the flange, the wheel is rotated until the bolt holes 34 are aligned with the mounting bolts 24, the wheel then being pushed onto the mounting bolts, as shown in FIG. 5. At this time, the fastening means of the device 10 is rotated until it is in alignment with the mounting bolts and is then driven to fasten the mounting nuts on the bolts to complete the assembly.

Referring now in detail to the device 10, a supporting ring 42 is connected to the hoist 22 through a bracket 44, a hook or ring 46, and a hoist line 48. The hoist 22 preferably is of the air-operated type as shown in my United States Patents 2,710,107 and 3,260,508. The ring 42 rotatably supports a fastening unit indicated at 50 through a bearing 52 and a pair of rings 54 and 56. The rings 54 and 56 are connected through three tubular housings 58 with the second ring 56 rotatably supporting a wheel-engaging unit 60 through a bearing 62 and an outer ring 64. In this manner, both the fastening unit 50 and the wheel-engaging unit 60 are rotatably supported by the ring 42 and each unit can rotate relative to the other and relative to the ring 42 by means of the bearings 52 and 62. The fastening unit 50 must be rotatable to enable the fastening means carried thereby to be aligned with the mounting bolts 24 while the wheel-engaging unit 60 must be rotatable to enable the bolt holes 34 in the hub 26 to be aligned with the mounting bolts 24.

Referring more specifically to the wheel-engaging unit 60, the outer ring 64 has a circular drum or housing 66 affixed thereto and extending forwardly toward the wheel. Three elongate supports or rods 68 extend forwardly from the ring 62 beyond the housing 66 and have outer ends affixed to a centering ring 70. The ring 70 helps support and position the rods 68 and also aids as a centering device by cooperating with the outer edge portion of the hub 26 to center the wheel-engaging unit 60. Particularly as shown in FIG. 6, a hub-engaging lever 72 is pivoted to each of the rods 68 by pivot pins 74. The levers 72, as shown, are in the form of tubular members having rear notched portions 76 and forward notched portions 78 to enable the levers to pivot with respect to the rods 68. The forward ends of the levers have bars 80 affixed thereto extending inside the periphery of the centering ring 70 with hub-engaging shoes 82 affixed to the bars forwardly of the ring 70 and facing outwardly. The shoes 82 engage the rim 28 of the hub 26 when the levers 72 are actuated thereby to enable the device 10 to pick up the wheel 12.

The shoes 82 are moved outwardly into engagement with the rim when the rear ends of the levers 72 are moved inwardly. As shown, this is accomplished by means of a flexible, collapsible container or tube 84 located adjacent the inner surface of the housing 66, between the housing and the levers. The tube 84 extends around most of the periphery of the housing and is supplied with fluid, specifically air, at one end by a line 86 (FIG. 3). The line 86 is connected to a supply line 88 through a valve 90 affixed to the rear surface of the ring 64 and having a handle 92. The operator can grasp the handle 92 to operate the valve 90 and also use the handle 92 to rotate the ring 64 which thereby rotates the levers 72 and the shoes 82 to cause the wheel 12 to rotate. In this manner, by manipulating the handle 92, the bolt holes 34 of the hub 26 can be aligned with the mounting bolts 24 when the wheel is centered with the axle flange 20. As shown in FIG. 6, springs 94 are located at the rear portions of the levers and enable the levers to move in a manner to release the shoes 82 from the rim when the tube 84 is collapsed by manipulation of the valve 90.

Referring now in more detail to the fastening unit 50, the tubular housings 58 extending between the inner rings 54 and 56 hold sleeve bearings 95 which slidably support three guide rods 96. The rods 96 extend between a front, generally triangular mounting plate 98 and rear, generally triangular manifold housing 100. The plate 98 and the housing 100 have openings 102 and 104 therein to receive five fastening means in the form of nut setters or runners 106. A shield 107 extends between the forward mounting plate 98 and the rear manifold plate 100 to protect the nut runners 106. The shield 107 also contains sound-deadening material to reduce the noise level of the nut runners during operation. The nut runners 106 are commercially available, pneumatically-operated devices which are well known in the art. Each employs a socket 108 to receive a nut 110 which fastens the hub 26 to the flange 20. The nuts 110 are loaded in the sockets 108 either manually or by a suitable loading device prior to the device 10 engaging and picking up one of the wheels 12.

The manifold housing 100 forms a central supply chamber 112 (see FIGS. 7 and 8) which supplies air to the five nut runners simultaneously. The air is supplied to the chamber 112 through a bearing nipple 114 on which is rotatably mounted a socket member 116 carrying a handle 118. air is supplied through the handle 118 by a supply line 120 which extends upwardly along with the hoist cable 48 to a suitable source of air through a main line 122 (FIG. 1) which can also supply the air to the hoist 22. The bearing nipple 114 enables the socket 116 and handle 118 to remain stationary while the nut runners are rotated with the rings 54 and 56 to align the sockets 108 with the mounting bolts 24. A hoist control valve 124 mounted on the rear manifold housing 100 has a handle 126 which enables the operator to rotate the fastening unit 50 more easily.

The fastening unit 50 is retracted or pulled to the rear position relative to the supporting ring 42 when the wheel 12 is engaged and carried to the automobile. This provides more effective visual access to the bolt holes 34 for the operator so that he can rotate the wheel-engaging unit 60 to the proper position to align the bolt holes with the mounting bolts. After the hub is on the bolts, the fastening unit 50 is moved forwardly by means of the handle 118 and is rotated by means of the hoist control handle 126 to position the nuts 110 at the ends of the mounting bolts 24. A trigger 128 on the handle 118 is then operated to open a valve in the handle and supply air to the nut runners. These drive the sockets 108 to thread the nuts 110 on the mounting bolts 24 thereby to complete the assembly. The air in the tube 84 is then released to enable the springs 94 to return the levers to their original positions and release the device 10 from the wheel.

When manipulating one of the wheels 12 to position it on the axle flange 20, the fastening unit 50 may be pushed forwardly undesirably, thereby obstructing vision of the bolt holes 34. To prevent this, a latch arm 130 (FIG. 3) is pivotally mounted by ears 132 on the manifold housing 100 with a handle 134 extending to the rear of the pivot. The forward end of the latch arm 130 abuts the rear ring 56 and prevents undesirable forward movement of the fastening unit. When the handle 134 is moved inwardly, the latch arm 130 moves outwardly and into alignment with an opening 136 in the ring 56. The unit 50 can then be shoved forwardly with the forward end of the latch arm 130 moving into the opening 136.

To review the assembling operation of the device 10, the device is brought to the wheel supply 14, being carried on the hoist 22 and movable along the rail 40 by the trolley 38. the hoist valve 124 is manipulated to raise or lower the device 10 to the level of the wheel hub 26. The device is then moved forwardly to place the wheel 12 with hub engaging shoes 82 in the plane of the rim 28 when the centering ring 70 engages an outer edge portion of the hub. The valve 90 is then operated to supply air to the flexible tube 84 to move the rear ends of the levers 72 inwardly and the shoes 82 outwardly to engage the rim. The device can then be raised slightly by means of the hoist and the hoist control valve 124 to clear the wheel rack 36. The wheel 12, the device 10, and the hoist 22 are then moved along the rail 40 by means of the trolley 38 to a position adjacent the assembly line conveyor 18 and near the axle flange 20 which is to receive the wheel 12.

By further manipulation of the hoist control valve 124, the device is then brought to the level of the axle flange 20 and centered with respect thereto. The handle 92 is then manipulated to rotate the hub 26 so that the bolt holes 34 are aligned with the mounting bolts 24. The device is then pushed forwardly to place the hub on the bolts. At this time, the latch 130 can be released and the fastening unit 50 moved forwardly and rotated at the same time by means of the handle 126 to align the sockets 108 and the nuts 110 with the bolts. When the nuts are moved to the ends of the bolts, the trigger 128 is operated to drive the nut runners and thread the nuts fully onto the bolts. The valve 90 is then operated to release air from the flexible tube 84 and enable the unit 60 to be separated from the now mounted wheel 12 to complete the operation.

Various modifications of the above described embodiment of the invention will be apparent to those skilled in the art, and it is to be understood that such modifications can be made without departing from the scope of the invention.

We claim:

1. A device for engaging an object having a circular cross section comprising a support, a supporting ring rotatably carried by said support, at least two elongate supports extending forwardly of said ring and supported thereby, an arm pivotally carried by each of said elongate supports, each of said arms having means for engaging a peripheral portion of the object, means forming an expandible, flexible fluid chamber carried by said ring, means for supplying fluid to said chamber for expanding said chamber means and pivoting said arms to cause said engaging means to move into an engageable position with the object, and fastening means rotatably carried by said support for affixing the object to a stationary member.

2. A device for handling a wheel for transporting the wheel and bolting the wheel to an axle flange of an automobile, a first ring for connecting the device to an overhead hoist, a second ring for engaging the wheel, bearing means rotatably carrying said second ring on said first ring, and fastening means rotatably carried by said first ring for affixing the wheel to the flange.

3. A device according to claim 2 wherein said fastening means includes a third ring rotatably carried by said second ring.

4. A device according to claim 3 wherein said third ring has sleeve bearings and said fastening means includes rod means slidably carried by said sleeve bearings for reciprocatory movement with respect to said third ring.

5. A device or handling a wheel for transporting the wheel and bolting the wheel to an axle flange of an automobile, a support for connecting the device to an overhead hoist, means rotatably carried by said support for engaging the wheel, a plurality of nut runners rotatably carried by said support for affixing the wheel to the flange, and means for positioning said nut runners in a predetermined pattern to fit with mounting bolts of an automobile, said positioning means including a front mounting plate and a rear manifold plate carrying said nut runners, said manifold plate having a central manifold communicating with said nut runners for supplying fluid thereto.

6. Apparatus according to claim 5 characterized by a valve for controlling the supply of air to said manifold, and means rotatably connecting said valve to said manifold plate to enable said valve to remain stationary when said plate is rotated.

7. A device according to claim 1 characterized further by a centering ring carried by said elongate supports near the outer ends thereof to cooperate with the circular object and facilitate centering said pivoted arms with respect to the object.

8. A device according to claim 1 characterized further by said chamber means constituting an elongate flexible tube extending around the inner periphery of said supporting ring to cooperate with and pivot said pivoted arms.

9. Apparatus for handling a wheel for transporting the wheel and bolting the wheel to an axle flange of an automobile, an overhead rail, a hoist, a trolley for movably supporting said hoist from said rail, said hoist having a hoist cable, a device for engaging a wheel and for fastening the wheel to the axle flange of the automobile comprising a supporting ring connected to said hoist cable, a second ring rotatably supported through said supporting ring and carrying sleeve bearings, a fastening unit comprising rods slidably carried by said sleeve bearings, supporting and positioning means affixed to said rod, a plurality of fastening means carried by said positioning and supporting means for assembling a hub of the wheel to the axle flange by means of fasteners, a third ring rotatably supported through said supporting ring, a plurality of levers supported by said third ring and engageable with the hub of the wheel, and means carried by said third ring for operating said levers to cause them to engage the hub.

10. A device according to claim 9 wherein said fastener devices are pneumatically operated.

11. Apparatus according to claim 9 characterized further by latch means carried by said positioning and supporting means to prevent undesirable reciprocation of said fastening unit relative to said supporting ring.

12. Apparatus according to claim 9 characterized by a flexible tube associated with said third ring for operating said levers.

13. Apparatus according to claim 12 characterized by means forming a valve affixed to said third ring for supplying fluid to said tube.

14. A device for handling a wheel for transporting the wheel and bolting the wheel to an axle flange of an automobile, a support for connecting the device to an overhead hoist, means rotatably carried by said support for engaging the wheel, a plurality of nut runners rotatably carried by said support for affixing the wheel to the flange, means for positioning said nut runners in a predetermined pattern to fit with mounting bolts of an automobile, a fluid supply hose for supplying fluid to said nut runners, a handle connected with said fluid supply hose and rotatably carried by said device, whereby said nut runners can be rotated while said handle is maintained stationary.

References Cited

UNITED STATES PATENTS

| | | | |
|---|---|---|---|
| 2,069,882 | 2/1937 | Hall | 81—57 |
| 2,179,608 | 11/1939 | Berg | 81—57 X |
| 3,070,876 | 1/1963 | Lyons | 29—240 |

ROBERT C. RIORDON, Primary Examiner

J. C. PETERS, Assistant Examiner

U.S. Cl. X.R.

81—57.24; 214—330; 294—97